United States Patent [19]

Lee

[11] Patent Number: 5,738,743
[45] Date of Patent: Apr. 14, 1998

[54] PROCESS FOR MAKING A MEASURING TAPE

[76] Inventor: Shih Tung Lee, 4F., No. 653, Ming Shui Rd., Taipei, Taiwan

[21] Appl. No.: 653,370

[22] Filed: Jul. 1, 1996

[51] Int. Cl.⁶ .................................................. G01B 3/10
[52] U.S. Cl. ........................... 156/153; 156/324; 33/755; 33/771
[58] Field of Search ..................... 33/755, 771; 156/153, 156/324

[56] References Cited

U.S. PATENT DOCUMENTS

| Re. 229,088 | 8/1947 | Witchger | 33/771 |
|---|---|---|---|
| 3,121,957 | 2/1964 | Brown | 33/771 |
| 3,205,583 | 9/1965 | Purbaugh | 33/755 X |

FOREIGN PATENT DOCUMENTS

| 261829 | 11/1988 | German Dem. Rep. | |
|---|---|---|---|
| 1800011 | 4/1970 | Germany | 33/755 |
| 2936393 | 3/1981 | Germany | 33/771 |
| 4317819 | 12/1994 | Germany | 33/755 |

Primary Examiner—Jeff H. Aftergut
Attorney, Agent, or Firm—Birch, Stewart, Kolasch & Birch, LLP

[57] ABSTRACT

The present invention relates to a treatment process for covering top of the measuring tape, and both sides of the blank of the measuring tape are treated with sand blast, then cleansed and blown dried, and one side is coated with adhesive, dried up to optimum attaching state, and then aluminum-foil is stuck to the coating side on the blank, and both are rolled into a spool after passing by a set of roller for sending into the oven for drying. The spool is stretched to the coater for coating double-side adhesive, and the adhesive is dried to the optimum attaching state. Before coating, the aluminum-foil is printed with scale lines, and finally transparent polyester film is covered on both sides of the blank of the measuring tape which is passed by a set of roller for firmly pressing together with the blank and then sent into the oven for drying. The process may produce a smooth and accurate measuring tape, and scale lines on the measuring tape can be durable for use without wearing, and it has the effect of extending the life of the measuring tape.

10 Claims, 2 Drawing Sheets

PROCESS FOR MAKING A MEASURING TAPE

BACKGROUND OF THE INVENTION

The present invention relates to a treatment process for a measuring tape top covering, and particularly to a course of aluminum-foil film or electroplating film covering onto the tape blank and then covering with thin polyester film to form a measuring tape top covering with a smooth surface to protect the printed scale from wearing and diminishing.

The present invention is mainly applied to the protection for the scale on the top of measuring tape so as to protect the scale from diminishing as a result of grinding due to operation and further to accomplish the effect of beautification on the top of the measuring tape. Generally speaking, referring to the measuring tapes produced by the factories or sold on the market, the colors and scales on the top of the measuring tapes are normally coated at first and then printed with the scales and finally are covered with a course of polish. The scales on the top of the measuring tapes when in use for a period of time following the increase in the number of pulling and withdrawing will become blurred so as to lose their function of indicating size. The phenomenon is only the defect of such measuring scales for use and it should require a number of improvements if tracing back to their production process, such as:

1. The top of a measuring tape in general is to form a smooth and beautiful state by means of coating process in common which is to soak the blanks (normally thin steel plate) of measuring tape into a paint tank and directly to pull out the blanks, and at the moment because the section of the blanks resembles an arc surface when the paint is getting dried it will be accumulated on two border lines of the blanks and the paint here will result in the error of length when the scale is printed to cause inaccurate measurement; besides, thicker paint accumulated will cause expansion of the blanks upon rolling and this will indirectly effect the smoothness of movement of the measuring tape in the case.

2. Before the blank of a measuring tape is soaked with the paint, in order to meet working attribute of coating, the surface of the measuring tape blank must be made very smooth and clean so as to allow coating for easy attaching and coating surface to become thin and bright; these procedures of treatment are time consuming and troublesome to lack of economic efficiency.

3. The scale lines on the top of the conventional measuring tape are made from the blank printing after coating; smoothness on the coating top of measuring tape makes weakening of printing attaching and friction by means of multiple extensions and shrinkings is liable to cause the scale lines falling off or obscure and this will affect measurement and accuracy of the size.

Viewing the conventional treatment process of the top of the measuring tape by means of coating can not accomplish for making an excellent measuring tape and the scale thereon is not easy for durable use, plus large consumption of energy during the process, it is not economical so that the process of the measuring tape has to have some change so as to continue the model of excellent measuring tape. Referring to this point, it is known through the inventor's different kinds of surface treatment, a kind of covering aluminum-foil or electroplating film onto the top of the blank of measuring tape, and then covering with polyester film after printing scale lines to achieve brightness on the top of measuring tape comparable to the conventional art of coating, however its scale lines are more durable than the conventional art of coating process; the more detailed process of the present invention is described below.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENT

Figure 1:
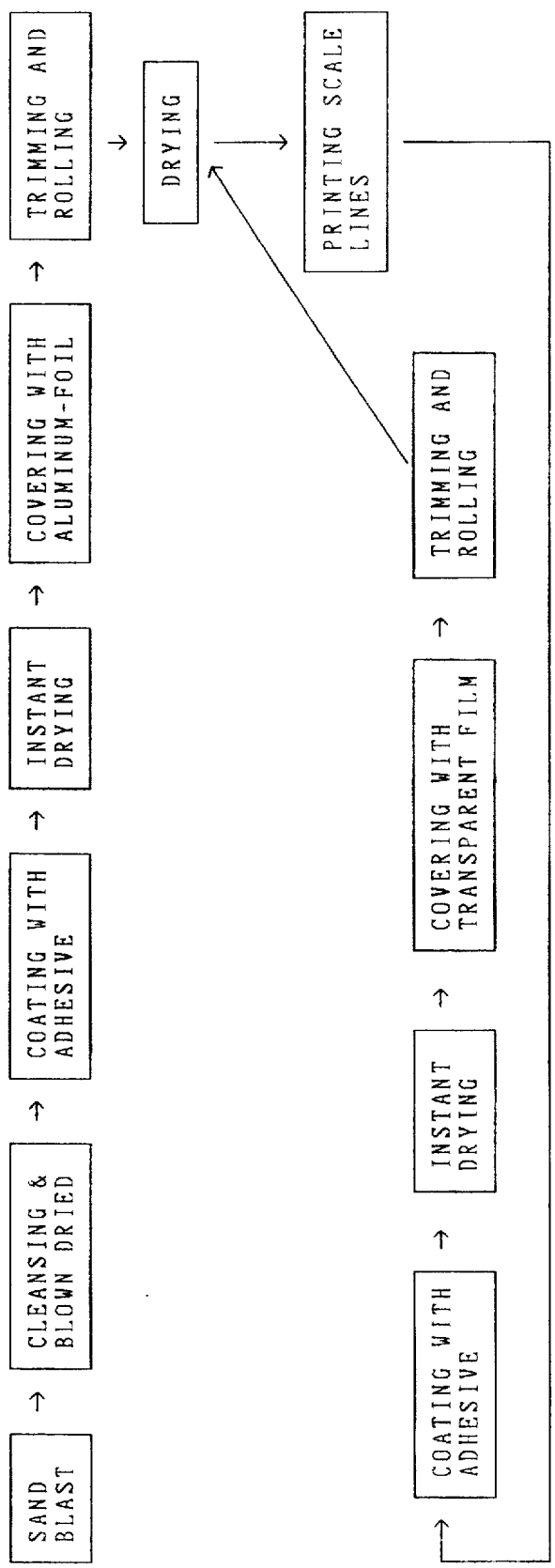
FIG. 1 is operating flow chart of the present invention.

Referring to FIG. 1, the process of the present invention, the surface of a blank for a measuring tape (normally made of steel) has to be treated with sand blast or ball impact, then the surface should be cleaned up and blown dried. Next, one top of the blank is coated with adhesive and slightly dried, then the adhesive top on the blank is covered with aluminum-foil film, whereafter trimming and rolling occur and then it is sent into the oven for drying. After the blank treatment drying is proceeded with printing the scale on the covering top. Upon the blank up completion of printing, the blank is double-sided coated with adhesive, then both tops of the blank are covered with transparent film, then trimmed and rolled for sending the blank into an oven for drying to finish the top covering treatment of the measuring tape.

Figure 2:
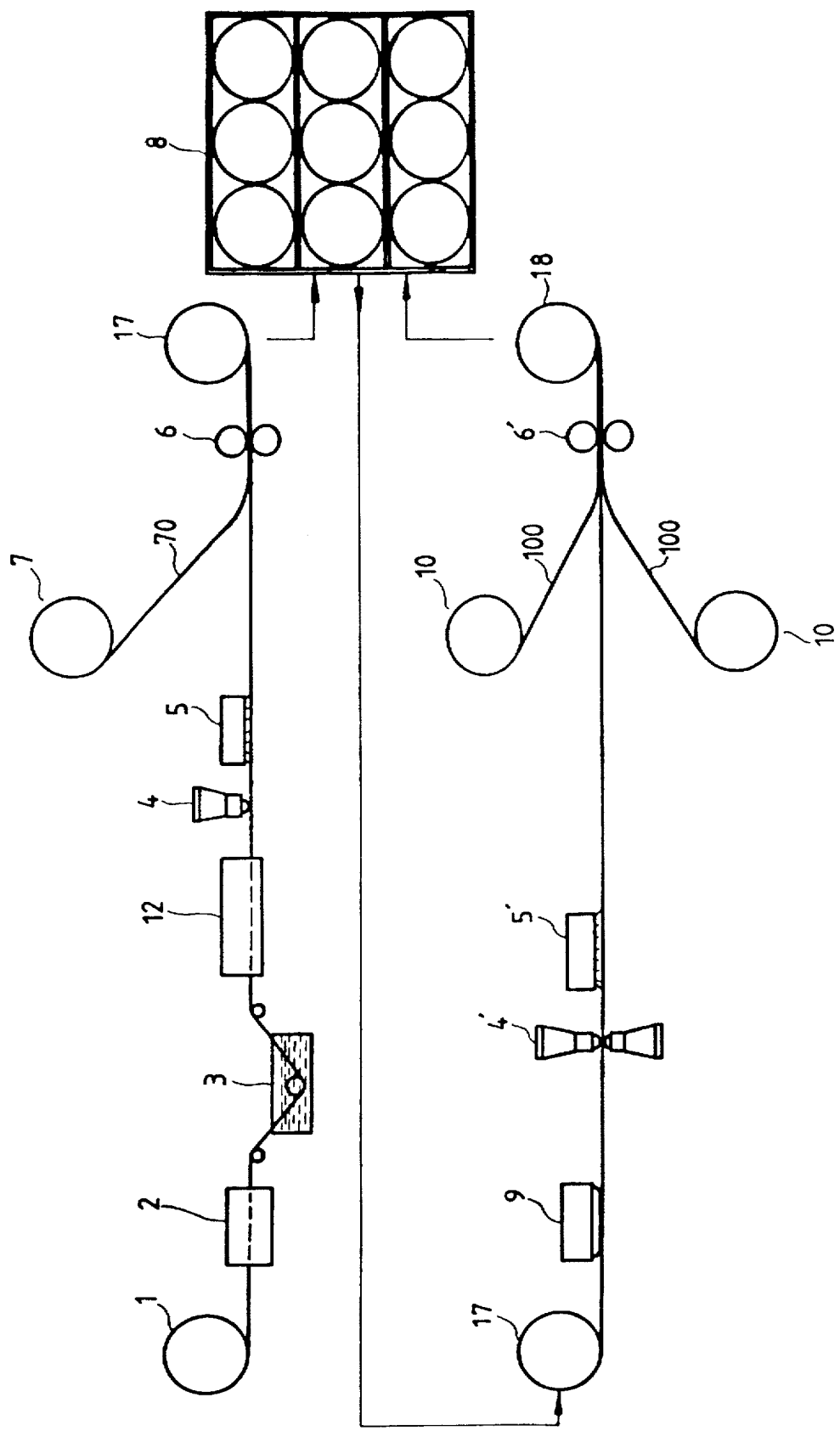
FIG. 2 is mounting layout of the present invention.

Referring to FIGS. 1 and 2, the present invention is at first to send the whole roll of steel tape blank 1 into the sand blast 2 for sand blasting or ball striking both sides of the tape blank 1. The procedure is to process the surface of the tape blank 1 with coarse surface having tiny recess holes in facility of attaching by adhesive coating thereafter. The tape blank 1, after sand blasting, is sent into the cleansing tank 3. In the cleansing tank 3, powder dust as a result of sand blasting on the surface of the tape blank is cleared away by evaporate solvent. The tape blank 1 after cleansing is blown dried by hot air and the other side is passing by the coater 4 for fully coating with adhesive and the coating side will then pass by an instant dryer 5 for drying the adhesive on the surface up to nearly adhesive condition. The tape blank 1 after sizing will pass by a set of roller 6 and will join together with the aluminum-foil film 70 led out by the aluminum-foil spool 7, and the tape blank 1 after attaching aluminum-foil film 70 will be rolled into a spool 17 for sending into the oven 8 for hot drying. The spool 17 after drying will then be led into a press 9 for printing the scale lines, and both sides of the measuring tape, upon completion of printing will pass by an upper and lower coater 4' for coating adhesive and then pass by the instant dryer 5' for drying the coating side up to optimum attaching condition. A thin transparent film 100 will then be pulled out of upper and lower ends of transparent film spool 10 for passing by another set of roller 6' and the surface of the measuring tape covering with the transparent film 100 from the top to the bottom will be rolled into the spool 18 for sending into the oven 8 for drying. Upon completion of drying up the surface of the measuring tape is a finished surface to be treated by the next stage such as cutting, punching, rivetting and assembly.

During the aforesaid treatment process, the surface of the measuring tape has to be coated with adhesive before covering with aluminum-foil or transparent film and then should pass by the instant dryer 5 for fast drying of mucus type glue up to attaching condition, and drying temperature shall be proper at 60° C. Upon covering with aluminum-foil or transparent film, the blank of the measuring tape rolled into a spool should be sent into the oven 8 for drying at the temperature of 60°–80° C., and the purpose of this process is to allow the adhesive of aluminum-foil or transparent film attaching to the blank of the measuring tape for entirely hardening and drying because the adhesive has been added about 10% hardening agent, and baking may help the hardening agent quickly hardening so that the adhesive may entirely join the aluminum-foil or transparent film with the blank of the measuring tape. Referring to the temperature control, dry temperature for the surface on the blank of the measuring tape is to let the blank pass by a hot-air tunnel 12 for drying up the liquid cleaner on the surface of the measuring tape by means of hot air at the temperature of 20°–30° C.

Referring to the treatment process on the surface of the measuring tape, said aluminum-foil is about 0.006 mm–0.008 mm thick, and if replaced by electroplating film, it will be about 0.012 mm–0.015 mm thick, and the covering of the transparent film is about 0.006 mm–0.012 mm thick. One side of the aluminum-foil film as the printing surface is smooth and the other side is fog surface which is easy for printing to attach thereon, and further the scale after printing will become easy for identification and beautiful. Therefore for covering of the aluminum-foil, the smooth side is joining together with the blank of the measuring tape and the fog side is reserved as the surface for printing scale. During the whole process of the present invention, except for the temperature inside the oven is controlled at 60° C.–80° C., the temperature during the covering and rolling processes is controlled at around 60° C. wherein each set of roller is kept at 60° C., and the speed of progress for the whole process is controlled at 30 m/min–60 m/min. The trimming is proceeded in consistence with rolling the blank of the measuring tape into the spool. Through the aforesaid processes, the top of the measuring tape has the following characteristics:

1. The surface on the measuring tape covering with aluminum-foil is smooth and has homogeneous color and its smoothness is superior to the coating surface in general and its color is more homogeneous than the coating surface.

2. The transparent polyester covering on the surface of the measuring tape not only protects its surface and printing scale lines thereon from erosion and destruction by any kind of solvent but also the polyester film thickness that lies in 0.006 mm–0.012 mm may allow the surface of the measuring tape to keep clarity of transparent color, and more important is the scale lines still may keep optimum reading identification after use by extending and shrinking for a long period.

3. The surface of the measuring tape manufactured by the present invention, because of homogeneous coating layer and homogeneous thickness of aluminum-foil and polyester film, the flatness on the surface of the measuring tape is excellent and it may avoid coating accumulation on the two boundary lines of the blank of the measuring tape normally found in manufacturing from coating, and certainly it will not have the problem relating to magnification or contraction of scale lines, and further it will not get expansion or stuck the check plate after rolling.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A process for manufacturing a measuring tape comprising the steps of:

providing a blank for manufacturing a measuring tape therefrom;

sand blasting both sides of the blank;

cleaning the blank with solvent;

drying the blank after the step of cleaning;

coating one side of the blank with adhesive;

drying the adhesive up to an optimum attaching condition;

covering a course of aluminum-foil on the side of the blank with the adhesive;

joining the blank and aluminum-foil together by passing the blank and aluminum-foil through a set of rollers;

rolling the blank with the aluminum-foil into a spool;

drying the spool of the blank and aluminum-foil in an oven to form a joined blank;

unspooling the joined blank and printing a side of the joined blank with scale lines;

coating both sides of the joined blank with adhesive;

drying the joined blank after the step of coating both sides;

covering both sides of the joined blank with transparent film;

joining the transparent film to the joined blank by passing the joined blank and transparent film through a set of rollers;

rolling the joined blank with the transparent film into a spool; and drying the spool with the transparent film in the oven for a period of time whereby the measuring tape is produced.

2. The process for manufacturing a measuring tape as claimed in claim 1, further comprising the step of keeping a temperature of the blank between 20° C. to 30° C. after the steps of cleaning and drying.

3. The process for manufacturing a measuring tape as claimed in claim 2, wherein the step of keeping the temperature uses hot air to maintain the temperature.

4. The process for manufacturing a measuring tape as claimed in claim 2, further comprising the steps of:

maintaining a temperature inside the oven in the range of 60° C. to 80° C.;

maintaining a mean temperature of rolling of about 60° C.; and at least one of pulling and winding the blank at a speed of 30 m/min to 60 m/min.

5. The process for manufacturing a measuring tape as claimed in claim 4, wherein a thickness of the aluminum-foil is in the range of 0.006 mm to 0.008 mm and a thickness of the transparent film is in the range of 0.006 mm to 0.012 mm, the transparent film being a polyester film and wherein the step of joining the blank and aluminum-foil attaches the aluminum-foil to a bright side of the blank.

6. The process for manufacturing a measuring tape as claimed in claim 5, further comprising the step of trimming the blank each time the blank is rolled into the spool.

7. The process for manufacturing a measuring tape as claimed in claim 1, further comprising the steps of:

maintaining a temperature inside the oven in the range of 60° C. to 80° C.;

maintaining a mean temperature of rolling of about 60° C.; and at least one of pulling and winding the blank at a speed of 30 m/min to 60 m/min.

8. The process for manufacturing a measuring tape as claimed in claim 7, wherein a thickness of the aluminum-foil is in the range of 0.006 mm to 0.008 mm and a thickness of the transparent film is in the range of 0.006 mm to 0.012 mm, the transparent film being a polyester film and wherein the step of joining the blank and aluminum-foil attaches the aluminum-foil to a bright side of the blank.

9. The process for manufacturing a measuring tape as claimed in claim 1, further comprising the step of trimming the blank each time the blank is rolled into the spool.

10. The process for manufacturing a measuring tape as claimed in claim 7, wherein the step of covering the blank with aluminum-foil includes the step of using aluminum-foil with a thickness in the range of 0.006 mm to 0.008 mm.

* * * * *